United States Patent Office 3,454,581
Patented July 8, 1969

3,454,581
DERIVATIVES OF BIS-(p-CHLOROPHENOXY) ACETIC ACID
Rudolf G. Griot, Florham Park, N.J., assignor to Sandoz Inc., Hanover, N.J.
No Drawing. Filed Feb. 21, 1967, Ser. No. 617,455
Int. Cl. C07d 29/02; C07c 69/76; A61k 27/00
U.S. Cl. 260—294.3                                    4 Claims

ABSTRACT OF THE DISCLOSURE

The compounds are of the class of esters of bis-(p-chlorophenoxy)acetic acid, e.g., bis-(p-chlorophenoxy) acetic acid, ester with 1-hydroxypiperidine, which are useful as hypocholesteremic/hypolipemic agents.

---

This invention relates to derivaties of acetic acid. In particular, the invention pertains to esters of bis-(p-chlorophenoxy)acetic acid which may be represented by the following structural formula:

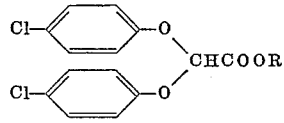

I wherein

R represents piperidino; cyanomethyl; or di-(carb(lower) alkoxy)methyl, the lower alkoxy substituent preferably containing from 1 to 4 carbon atoms, e.g., methoxy, ethoxy, propoxy and butoxy.

The compound of Formula I wherein R is piperidino is prepared by converting bis-(p-chlorophenoxy)acetic acid to its corresponding acid halide and reacting the latter with 1-hydroxypiperidine or an appropriate salt thereof. The compounds of Formula I wherein R is cyanomethyl or di-(carb(lower)alkoxy)methyl are prepared by reacting bis-(p-chlorophenoxy)acetic acid with a haloacetonitrile or dialkylhalomalonate, respectively. These processes are illustrated by the following reaction scheme:

of the halide reagent can be employed for this purpose. It is generally preferred to carry out the reaction in the presence of a catalytic amount of dimethylformamide. The reaction of the thus-obtained acid halide with the alcohol or alcoholate is conveniently effected in a suitable inert organic solvent, e.g., benzene, toluene, chloroform and diethyl ether, and at room temperature (20° C.) or below. Preferably the reaction is carried out at a temperature of from about —10° to about 5° C. Where the free alcohol is employed it is desirable to provide a means for taking up the liberated hydrogen halide. This can be accomplished by employing an excess of the alcohol or by carrying out the reaction in the presence of an alkali metal carbonate, e.g., potassium carbonate, or suitable inert base, e.g., pyridine. Where an alcoholate is used, the alkali metal salts, particularly the sodium and potassium salts, are preferred. The desired product thus obtained is readily recovered in conventional manner.

The preparation of the compound of Formula Ib, via reaction of bis-(p-chlorophenoxy)acetic acid with a haloacetonitrile, is readily effected in a suitable inert organic solvent, e.g., dioxane, tetrahydrofuran and ethyl acetate, at elevated temperatures up to the reflux temperature of the system and in the presence of a tertiary amine, e.g., triethylamine, triisobutylamine and pyridine, to take up the liberated hydrogen halide. Preferably, the reaction is carried out in ethylacetate at reflux temperature and in the presence of triethylamine.

The reaction of bis-(p-chlorophenoxy)acetic acid with a dialkylhalomalonate to form compounds of Formula Ic is carried out in the same manner as indicated above for the preparation of Compound Ib.

The bis-(p-chlorophenoxy)acetic acid (II), employed as the starting material in the processes described above, can be readily prepared from either the alkyl ester of bis-(p-chlorophenoxy)acetic acid or dialkyl ester of bis-(p-chlorophenoxy)malonic acid by reacting the same in an aqueous, inert organic solvent, with a strong base, at room temperature or elevated temperatures. The base is preferably one which will yield a water-soluble salt of the desired acid, e.g., sodium hydroxide and potassium hydroxide. The acid is then obtained by simply treating the thus-obtained

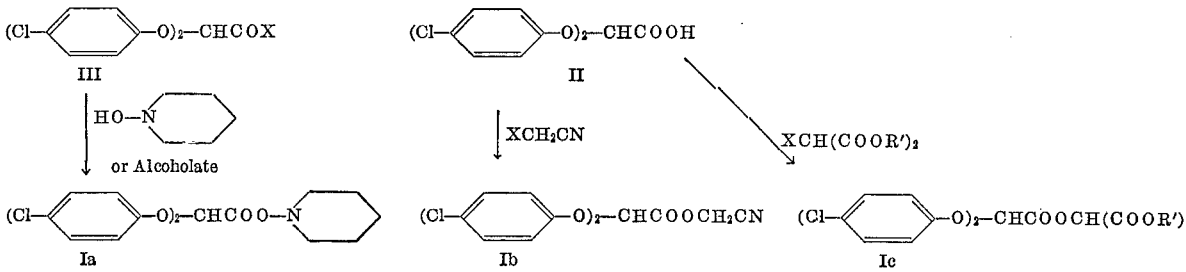

wherein R' represents lower alkyl, preferably containing from 1 to 4 carbon atoms, e.g., methyl, ethyl, propyl and butyl, and X represents halo having an atomic weight of from 35 to 80, i.e. chloro or bromo.

In the preparation of compound Ia, bis-(p-chlorophenoxy)acetic acid (II) is converted to the corresponding acid halide (III) by reaction with thionyl chloride or other suitable reagent commonly used for this purpose, e.g., thionyl bromide, phosphorus pentachloride and phosphorus pentabromide. The reaction is conveniently carried out in a suitable inert organic solvent and at room temperature (20° C.) or elevated temperatures up to reflux temperature of the system. However, the use of a solvent is not necessary since an excess salt with a mineral acid, such as hydrochloric acid, in conventional manner. The mono- and dialkyl esters referred to above are prepared by reacting p-chlorosodium phenolate (prepared from p-chlorophenol and sodium hydride) with an alkyldichloroacetate or dialkyldibromomalonate, respectively. The reaction is readily carried out in a suitable inert organic solvent, e.g., dimethylacetamide, diethylacetamide and dimethylformamide, and at room temperature or elevated temperatures (which should not exceed about 80° C. when it is desired to prepare the dialkyl esters of bis-(p-chlorophenoxy)malonic acid).

Various of the dialkylhalomalonates employed in the preparation of compounds of Formula Ic are known and can be prepared as described in the literature. Such others which may not be specifically disclosed in the literature may be prepared in analogous manner.

The compounds of structural Formula I are useful because they possess pharmacological activity in animals. In particular, the compounds possess marked hypocholesteremic activity and can be used as hypochloesteremic/hypolipemic agents.

For such usage, the compounds may be admixed with conventional pharmaceutical carriers, and other adjuvants, if necessary, and administered orally in such forms as tablets, elixirs, suspensions or solutions. The dosage administered will, of course, very depending on the compound employed. However, in general satisfactory results are obtained when administered at a daily dosage of from about 4 milligrams to about 30 milligrams per kilogram of animal body weight, preferably given in divided doses, 2 to 4 times a day, or in sustained release form. For most mammals the administration of from about 0.25 gram to about 2 grams of the compound in divided doses from about 62.5 milligrams to about 1000 milligrams 2 to 4 times a day, is adequate for the treatment of hypercholesteremia/hypolipemia.

A representative formulation suitable for oral administration is a tablet (prepared by standard tabletting procedures) and containing, by weight, 50 parts of bis-(p-chlorophenoxy)acetic acid, ester with 1-hydroxypiperidine, 2 parts of tragacanth, 39.5 parts of lactose, 5 parts of corn starch, 3 parts of talcum and 0.5 part of magnesium stearate.

The following examples show representative compounds contemplated by the present invention and the manner in which said compounds are prepared. However, it is to be understood that the examples are intended for the purpose of illustration only and are not intended as in any way limiting the scope of the invention which is defined in the appended claims.

EXAMPLE 1

Bis-(p-chlorophenoxy)acetic acid, ester with 1-hydroxypiperidine

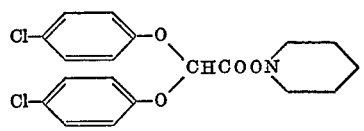

A mixture of 20.2 g. (0.2 mole) of 1-hydroxypiperidine and 800 ml. of absolute diethyl ether is stirred and cooled to about 0° C. in an ice-salt bath. To the cooled mixture is then added dropwise with stirring a soltuion of 33.15 g. (0.1 mole) of bis-(p-chlorophenoxy)acetyl chloride in 400 ml. of absolute diethyl ether, while maintaining the temperature of the reaction mixture between —5° to 0° C. with external cooling. After the addition is completed, the mixture is stirred for an additional 20 minutes and then, while cooling, 400 ml. of a cold saturated solution of sodium carbonate is added and the phases separated. The aqueous phase is extracted with 500 ml. of absolute diethyl ether. The combined organic phases are then washer twice with 400 ml. (each) of cold water, dried over anhydrous potassium carbonate and evaporated to dryness. The residue is recrystallized from absolute diethyl ether, using some charcoal as a decolorizing agent, to obtain bis-(p-chlorophenoxy)acetic acid, ester with 1-hydroxypiperidine, M.P. 89–89.5° C.

EXAMPLE 2

Bis-(p-chlorophenoxy)acetic acid cyanomethyl ester

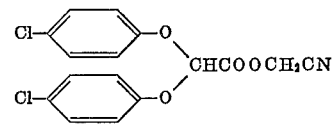

A mixture of 50 g. (0.16 mole) of bis-(p-chlorophenoxy)acetic acid, 24.2 g. of triethylamine and 18.1 g. (0.24 mole) of chloroacetonitrile and 240 ml. of ethyl acetate is refluxed on a steam bath for 24 hours, then filtered and the ethyl acetate solution extracted once with 500 ml. of water and then twice with 500 ml. (each) of 2 N hydrochloric acid. The ethyl acetate layer is then dried over sodium carbonate, filtered with charcoal and then evaporated. The residue is crystallized and recrystallized from diethyl ether-petroleum ether (1:1) and washed with isopropyl ether to obtain bis-(p-chlorophenoxy)acetic acid cyanomethyl ester, M.P. 75–76° C.

EXAMPLE 3

Bis-(p-chlorophenoxy)acetic acid dicarbethoxymethyl ester

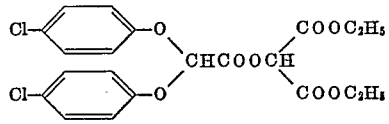

A mixture of 50 g. (0.16 mole) of bis-(p-chlorophenoxy)acetic acid, 24.2 g. (0.24 mole) of triethylamine, 57.3 g. of (0.24 mole) of diethylbromomalonate and 240 ml. of ethyl acetate is refluxed on a steam bath for 24 hours, then filtered and the ethyl acetate solution extracted once with 500 ml. of water and then twice with 500 ml. of 2 N hydrochloric acid. Then ethyl acetate layer is then dried over sodium carbonate, filtered with charcoal and then evaporated. The residue is distilled using a high vacuum diffusion pump and a maximum oil bath temperature of 250° C. to obtain bis-(p-chlorophenoxy)acetic acid dicarethoxymethyl ester, B.P. 198–228° C./0.001–0.002 mm.

What is claimed is:

1. A compound of the formula

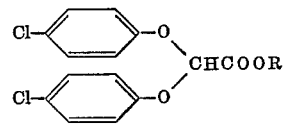

wherein
R represents piperidino, cyanomethyl or di(carb(lower)alkoxy)methyl.

2. Bis-(p-chlorophenoxy)acetic acid, ester with 1-hydroxypiperidine.
3. Bis-(p-chlorophenoxy)acetic acid cyanomethyl ester.
4. Bis-(p-chlorophenoxy)acetic acid dicarbethoxymethyl ester.

References Cited

UNITED STATES PATENTS 2,765,224   10/1956   Lambrech _____ 71—107

OTHER REFERENCES

Brunet et al., Bull. Soc. Chim. France. vol. 1964, No. 2, pp. 383–385.

HENRY R. JILES, *Primary Examiner.*

G. T. TODD, *Assistant Examiner.*

U.S. Cl. X.R.

260—294, 465, 473, 520; 424—267, 304, 308, 340